May 17, 1932. F. T. IRGENS 1,859,038
HANDLE MOUNTING
Filed June 22, 1931
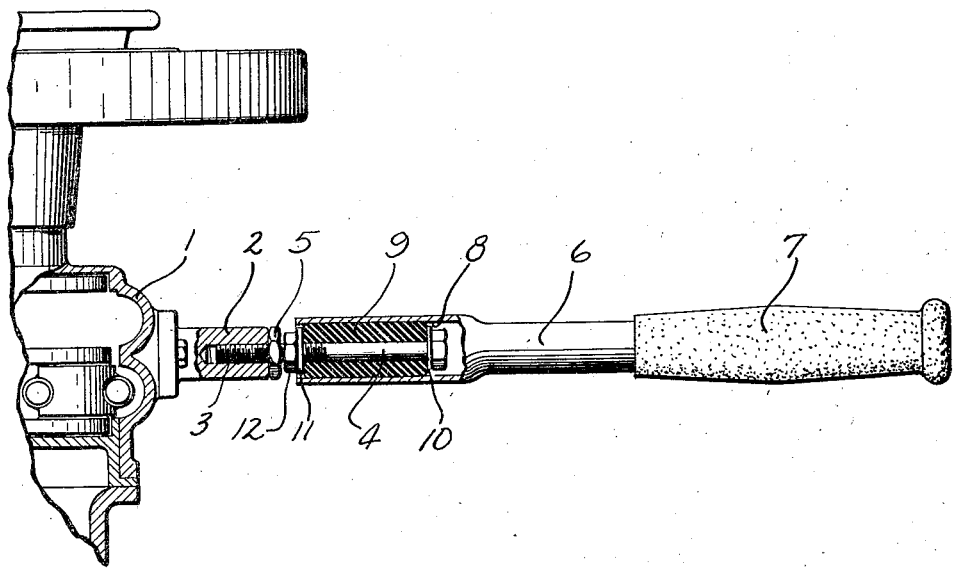
INVENTOR
Finn T. Irgens
BY
Wheeler, Wheeler & Wheeler
ATTORNEYS Patented May 17, 1932

1,859,038

UNITED STATES PATENT OFFICE

FINN T. IRGENS, OF WAUWATOSA, WISCONSIN, ASSIGNOR TO OUTBOARD MOTORS CORPORATION, OF MILWAUKEE, WISCONSIN, A CORPORATION OF MICHIGAN

HANDLE MOUNTING

Application filed June 22, 1931. Serial No. 546,068.

This invention relates to improvements in handle mountings.

It is the object of the invention to provide an economical form of shock absorbing tiller handle wherein the handle is readily mounted and detached and the freedom of yieldability thereof is subject to control.

While the invention is referred to with reference to tiller handles such as are commonly used on outboard motors and the like it is of general application to any handle installation where the features of the invention will be of advantage.

The drawing illustrates partially in side elevation and partially in axial section, a fragment of an outboard motor engine and a tiller embodying this invention.

The outboard motor selected as a means of illustrating the application of the invention to practical usage may be of the conventional type which turns bodily for steering. To the engine crank case 1 is bolted the rigid portion 2 of the tiller, and tapped socket 3 in tiller portion 2 receives a mounting member comprising a bolt 4 which is threaded therein and securely fastened by lock nut 5.

The handle member 6 has a grip portion 7 at its free end and a socket 8 at the end requiring connection to the motor. Fitted into the socket of handle 6 is a tubular body 9 of elastic material such as rubber through which the bolt 4 passes. The ends of the elastic body 9 are confined between washers 10 and 11 the former being held by the head of the bolt and the latter by a nut 12 used for adjustment.

The rubber sleeve 9 is preferably of such dimensions that when it is not subject to longitudinal compression it is freely receivable into the socket of handle 6 and freely removable therefrom. By turning up the nut 12 toward the solid end of bolt the operator is able to subject the rubber mass 9 to longitudinal compression which will expand its diameter until the mass fits tightly within the socket of handle 6. Any further compression to which it is subjected will compact its mass and render it less elastic. If only a moderate degree of compression is used the rubber will engage the interior surface of the handle member 6 with sufficient friction to hold the handle fast on bolt 4 while at the same time permitting it sufficient freedom of vibratory movement so that virtually all engine vibration is absorbed and the operator's hand on the grip 7 is relieved thereof. Greater or less flexibility is achieved by adjustment of the nut.

I claim:

1. A handle mounting comprising a handle member having a socketed end portion and a mounting member, a tubular elastic mass positioned within said socketed end portion and clamping means coacting with said elastic mass and adapted to distort it in a radial direction into engagement with the wall of the socket.

2. A handle mounting comprising the combination with a handle member and a mounting member, one of which has a socketed end portion and the other of which extends into the socket in spaced relation to the sides thereof, of a tubular elastic mass positioned within said end portion in engagement with both of said members, and clamping means co-acting with said elastic mass and adapted to distort it transversely of said socket into pressure engagement with said members, whereby to retain said members in assembly while permitting elasticity of movement of said handle member with respect to said mounting member.

3. A handle of the class described having in combination a threaded mounting device, a sleeve connected therewith, a tubular rubber mass interposed between said mounting device and said sleeve, retaining means on said mounting device confining said mass against axial displacement in one direction and a nut threaded to said mounting device and acting on said mass in opposition to said retaining means, whereby readily to distort said mass against the wall of said sleeve for frictionally retaining the sleeve in engagement with said mass.

4. The combination with a handle bracket, of a bolt in threaded engagement therewith and provided with a head, an annular rubber cushion mounted on said bolt, a nut threaded to said bolt and acting on said cushion for the distortion thereof in a radial direction and a handle member provided with a sleeve freely receivable over said cushion in its uncompressed condition and adapted to be engaged through the expansion of said cushion under the compression of said nuts.

FINN T. IRGENS.